United States Patent
Berg et al.

[11] Patent Number: 5,861,057
[45] Date of Patent: Jan. 19, 1999

[54] DRAINAGE CONCRETE

[75] Inventors: Volkmar Berg, Graben-Neudorf; Siegfried Riffel, Waghaeusel, both of Germany

[73] Assignee: Hoechst Aktiengesellschaft, Frankfurt am Main, Germany

[21] Appl. No.: 549,075

[22] Filed: Oct. 27, 1995

[30] Foreign Application Priority Data

Nov. 7, 1994 [DE] Germany .......................... 44 39 689.9

[51] Int. Cl.[6] .................................................. C04B 38/00
[52] U.S. Cl. .......................... 106/672; 106/677; 106/696; 106/724; 106/823
[58] Field of Search ..................................... 106/605, 606, 106/608, 601, 672, 677, 678, 696, 724, 820, 823; 404/82

[56] References Cited

U.S. PATENT DOCUMENTS

| | | | |
|---|---|---|---|
| 4,157,998 | 6/1979 | Berntsson et al. | 106/692 |
| 4,514,531 | 4/1985 | Kleeb et al. | 524/5 |

FOREIGN PATENT DOCUMENTS

| | | |
|---|---|---|
| 2004396 | 6/1990 | Canada . |
| 2093606 | 10/1993 | Canada . |
| 2 613 356 | 10/1988 | France . |
| 1 121 530 | 1/1962 | Germany . |
| 24 36 081 | 7/1974 | Germany . |
| 2 306 360 | 8/1974 | Germany . |
| 31 00 569 A1 | 1/1981 | Germany . |
| 42 12 325 A1 | 4/1992 | Germany . |
| 1 320 234 | 6/1973 | United Kingdom . |
| 89/09196 | 10/1989 | WIPO . |

OTHER PUBLICATIONS

Intron Report No. 94229, Jul. 5, 1994, E. Onstenk, et al.

*Primary Examiner*—Paul Marcantoni
*Attorney, Agent, or Firm*—Foley & Lardner

[57] ABSTRACT

Drainage concrete having a void volume of from 10 to 35% by volume and methods for its production and use. The drainage concrete comprising a) a hydraulic binder selected from the group consisting of cements, b) a polymeric binder comprising an anionic styrene/(meth)acrylate copolymer, and c) aggregates having particle sizes in the range from 2 to 32 mm and is suitable for producing a noise-reducing, highly absorbent, and water-permeable road surfacing which meets traffic safety requirements.

22 Claims, 2 Drawing Sheets

DRAINAGE CONCRETE

BACKGROUND OF THE INVENTION

1. Field of the Invention

The present invention relates to a noise-reducing, highly absorbent and water-permeable concrete, known as drainage concrete, a process for its production, and its use as, for example, open-pored road surfacing.

2. Description of Related Art

In recent years, the environmental consciousness of people has risen considerably, also with regard to noise pollution. Owing to the great rise in traffic density, particularly on highways, the subject of traffic noise now occupies a central position.

The causes of traffic noise are:

drive of the vehicle (drive noise/engine noise), rolling of the tires of the road surface (tire-road noise/rolling noise).

The rolling noise is caused mainly by the following:

a) radial tire vibration:
   impact of the profile elements on the road surface,
   compression of the tire profile as a result of the surface texture,
b) resonance of the air between tire and road surface:
   pipe resonance,
   Helmholz resonance,
   air pumping,
c) adhesion:
   tangential vibration as a result of stick-slip movements,
   tearing off of profile elements,
d) collision of profile elements:
   water film and acceleration of water droplets (only in the case of a wet road surface).

Lawmakers have taken account of the increased occurrence of noise with "(German) Guidelines for noise abatement on roads—1990 edition—RLS—90" and "16th (German) Regulations for implementation of the Federal Law on Environmental Protection" (Traffic Noise Regulations—16th BImScH V). To achieve these aims, the following measures are still mainly applied:

The noise is reduced at the source, i.e. the motor vehicle or the motor vehicle tires.

The area over which the noise spreads is limited by protective walls and protective embankments.

Recently, efforts have also been made to reduce the spread of noise from the road surfacing. The largest influences on the sound emission of a road surface are the megatexture (texture wavelength 50–250 mm), the macrotexture (texture wavelength 1–50 mm), the acoustic impedance (sound absorption).

On driving over a porous road surface, the air under the vehicle tires can escape into the voids of the road surfacing, so that, in particular the high-frequency region of the rolling noise is reduced. The absorption should be as effective as possible in the frequency range of human hearing and indeed preferably in the particularly sensitive region between about 200 and 2000 Hz.

The acoustic impedance of an open-pored road surface is determined by:

the porosity (accessible void content), the flow resistance (permeability), the structure factor (pore structure in the accessible voids, connection of the pores to one another), the thickness of the layer.

In practice, highly porous surfacings have proven useful as surface layer, for example drainage asphalt or "whisper asphalt". Open-pored or highly porous road surfacings allow the sound level to be reduced by up to 5 dB(A) in comparison with traditional dense surfacings. However, for open-pored asphalt surfacings the currently expected life is at most 6 years, so that such open-pored surfacings have to be replaced substantially more often than conventional dense asphalt surfacings.

Compared with asphalt, concrete basically has the advantage of a considerably longer life, so that concrete surfaces require less frequent maintenance work. Efforts are therefore being made to furnish concrete surfacings with appropriate noise-reducing properties (Intron Report No. 94 229, Porous Concrete—Laboratory tests, pages 11–12). At the same time, however, the positive properties of the concrete, for example high durability, should be retained.

Modifying concrete with polymers to improve the application properties is basically known. According to DE-A 42 12 325, concrete modified with styrene/acrylate dispersion gives water-impermeable articles. However, for sufficient water permeability and high sound absorption, the porosity and the structure factor of the concrete should be as high as possible.

In the attempts made hitherto to produce polymer-modified porous concretes, it was found that void content and strength display opposite trends. The higher the void content, the lower the strength of the road surfacing. At the same time, in the case of a void content which is acoustically effective, the strength was found to be insufficient for highly stressed road surfacing. In the experiments carried out hitherto, the bonding between the acoustically effective road surfacing and the concrete underneath was also found to be insufficiently durable (Intron Report No. 94 229, Porous Concrete—Laboratory tests, page 73).

SUMMARY OF THE INVENTION

It is therefore an object of the present invention to develop a drainage concrete which effects the required noise reduction in road surfacing, meets all traffic safety requirements, has good adhesion to the base, and possesses a long life.

It is also an object to provide methods of making and using such concrete.

In accordance with these objectives, there is provided a drainage concrete having a void volume of from 10 to 35% by volume, comprising (a) a hydraulic binder selected from the group consisting of cements, (b) a polymeric binder comprising an anionic styrene/(meth)acrylate copolymer, and (c) aggregates having particle sizes in the range from 2 to 32 mm.

In accordance with these objectives, there is additionally provided a process for producing a drainage concrete comprising mixing the hydraulic binder, the polymeric binder, the aggregates with water. This process may optionally be accomplished by first mixing the aggregates and hydraulic binder with water and then the polymeric binder is subsequently added in the form of an aqueous dispersion.

These objects are additionally achieved by providing a method for producing a water-permeable road surfacing comprising curing a base concrete and installing a drainage concrete of the above composition on the base concrete.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate an embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
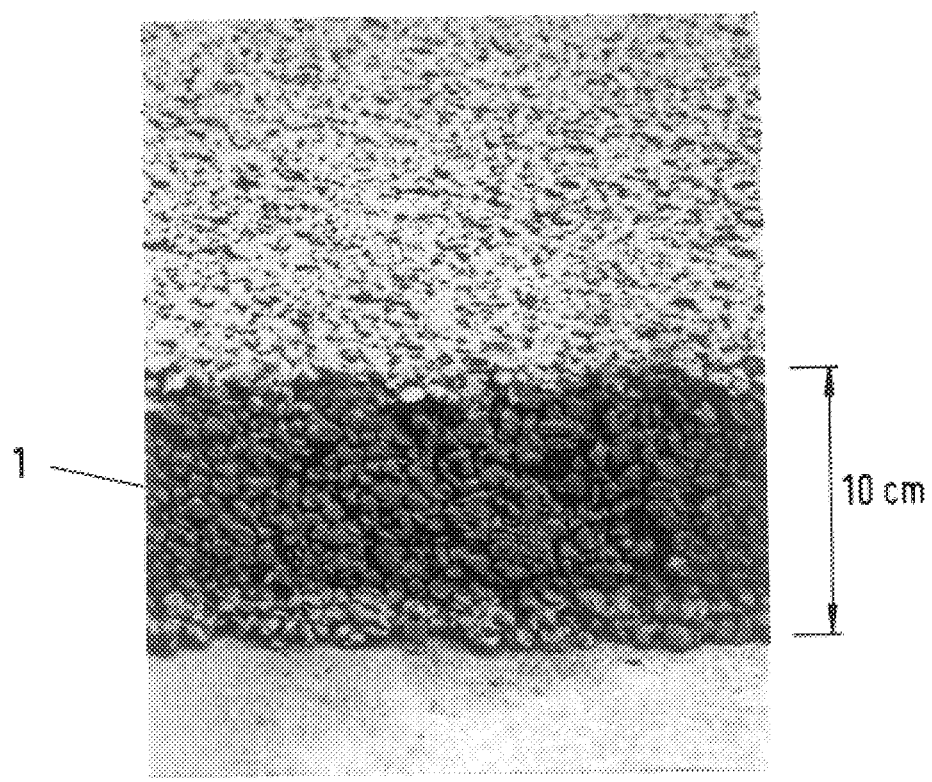
FIG. 1 shows a covering layer of a drainage concrete on a base concrete. The porosity and the relatively uniform drain size distribution in the drainage concrete matrix can be clearly seen.

The present invention provides a drainage concrete having a void volume of from 10 to 35% by volume, containing a hydraulic binder selected from the group consisting of cements and a polymeric binder in the form of an anionic styrene/(meth)acrylate copolymer whose minimum film-formation temperature (MFT) is preferably above the ambient temperature in processing the drainage concrete, and also aggregates having particle sizes in the range from 2 to 32 mm. A drainage concrete having the desired characteristics is also achieved by employing monograin concrete, that is, concrete having a narrow grain size distribution, which contains an anionic styrene/(meth)acrylate dispersion.

The proportion of the polymeric binder is preferably from 5 to 40% by weight, in particular from 10 to 30% by weight, based on the mass of the hydraulic binder. The MFT of the polymeric binder is preferably above 30° C. and is in particular from 30 to 60° C., particularly preferably from 35 to 50° C.

Any anionic styrene/(meth)acrylate copolymer can be used in the invention. Particularly suitable according to the invention for use in drainage concrete are, for example, aqueous polymer dispersions based on anionic copolymers of the following monomers:

a) from 51 to 60, in particular from 51 to 58, parts by weight of styrene and, if desired, methyl methacrylate, b) from 40 to 45 parts by weight of ($C_2$–$C_8$)-alkyl acrylate, and/or ($C_4$–$C_8$)-alkyl methacrylate, c) from 2 to 4 parts by weight of $\alpha,\beta$-unsaturated carboxylic acids, where the sum of a)+b)+c) must give 100 parts by weight of copolymer and these copolymers additionally contain, in each case based on 100 parts by weight of copolymer of a)+b)+c), d) from 0 to 2% by weight of ethylenically unsaturated comonomer units containing sulfonic acid groups or phosphoric acid groups and e) from 0 to 2% by weight of ethylenically unsaturated comonomer units containing organosilicon radicals which may be reactive, f) from 0 to 2% by weight of epoxysilanes mixed into the aqueous polymer dispersions, where the sum of e)+f) is at most 2% by weight.

Particularly preferred polymer dispersions according to the invention are, for example, those based on anionic copolymers having the following composition:

a) from 52 to 55 parts by weight of styrene, b) from 41 to 44 parts by weight of n-butyl acrylate, c) from 2 to 3 parts by weight of acrylic acid and/or methacrylic acid, d) from 0.5 to 1.5 parts by weight of ethylenically unsaturated comonomers containing sulfonic acid groups, e) from 0.5 to 1.5 parts by weight of ethylenically unsaturated comonomers containing organosilicon radicals which may be reactive, f) from 0.5 to 1.5 parts by weight of epoxysilanes mixed into the aqueous polymer dispersions, where the sum of e)+f) is at most 2 parts by weight.

By means of the contents according to the invention of comonomer units containing organosilicon radicals (e) in the anionic copolymers or by means of the epoxysilanes (f) mixed according to the invention into the aqueous polymer dispersions, the use of the polymer dispersions in concrete mixtures enables the chemical resistance of the cured concrete to be further improved.

The copolymers may be produced in an emulsification polymerization using the usual emulsifier, and used in the concrete in the form of dispersions.

As emulsifiers, the dispersions preferably contain customary ionic and, in particular, anionic and/or customary nonionic surface-active compounds in the customary amounts for emulsion polymerizations. For example, the polymer dispersions contain as emulsifiers, in each case based on the anionic copolymer, from 0.3 to 2% by weight, preferably from 0.5 to 1.5% by weight, in particular from 0.6 to 1% by weight, of anionic emulsifiers, preferably emulsifiers containing sulfo groups, in particular alkali metal salts of sulfuric acid monoesters of ethoxylated alkylphenols, and from 1 to 5% by weight, preferably from 1.5 to 3% by weight, in particular from 2 to 2.5% by weight, of nonionic emulsifiers, preferably alkylphenol polyglycol ethers, in particular nonylphenol polyglycol ethers or tributylphenol polyglycol ethers having preferably from 15 to 50 ethylene oxide units.

Suitable hydraulic binders which can be used according to the invention include all amorphous inorganic materials which can react chemically with water to form cement-like crosslinking structures. Preference is given to all types of cement in accordance with DIN 1164 or special cements having building approval, in particular Portland cement, and also composite cements, i.e. mixtures of these types of cement with materials which can supplement or improve the action of cement, preferably fly ash from black coal combustion processes or from the silicon production process.

The proportion of the hydraulic binder is preferably from 10 to 35% by weight, in particular from 10 to 30% by weight, particularly preferably from 15 to 25% by weight, based on the drainage concrete.

The aggregates to be used according to the invention preferably have a particle size in the range from 2 to 32 mm, in particular from 4 to 9 mm, particularly preferably from 5 to 8 mm. In addition, particular preference is given to a particle size distribution which is as uniform as possible.

Suitable aggregates include any known, those which may be mentioned are, for example, high-grade chippings 100%, chippings 100%, rounded-grain gravel 100%, and also mixtures of these aggregates.

The proportion of the aggregates is preferably from 65 to 85% by weight, in particular from 70 to 80% by weight, based on the mass of the drainage concrete.

If desired, the drainage concrete can contain additives, for example concrete fluidizers, levelling agents, setting retardants, stabilizers. Suitable additional concrete components that can be used to influence the mechanical properties of the solid concrete include fibers of polymer, glass, metal, carbon, and cellulose.

The drainage concrete of the invention is produced in any desired manner, such as by mixing the hydraulic binder, the polymeric binder, the aggregates and, if desired, further additives and/or additional components with water. Preferably, aggregates and hydraulic binders are first mixed with water and the polymeric binder is subsequently added in the form of an aqueous dispersion.

According to the invention, the void volume of the drainage concrete is preferably from 10 to 35% by volume, in particular from 15 to 30% by volume, particularly preferably from 20 to 25% by volume.

The water-cement ratio (w/c ratio) of the drainage concrete is preferably from 0.15 to 0.50, in particular from 0.16 to 0.40, particularly preferably from 0.20 to 0.30.

The drainage concrete of the invention preferably has, 28 days after being produced, a compressive concrete strength of $\geq 15 N/mm^2$, in particular $\geq 25 N/mm^2$, particularly preferably $\geq 39 N/mm^2$, a bending tensile strength of $\geq 3.5 N/mm^2$, in particular $\geq 5.0 N/mm^2$, particularly preferably $\geq 6.5 N/mm^2$, a tensile splitting strength of $\geq 2.0 N/mm^2$, in particular $\geq 2.5 N/mm^2$, particularly preferably $\geq 3 N/mm^2$, a surface tensile strength of $\geq 2.0 N/mm^2$, in particular $\geq 3.0 N/mm^2$, particularly preferably $\geq 3.5 N/mm^2$, and a static modulus of elasticity of $\leq 25,000 N/mm^2$, in particular $\leq 20,000 N/mm^2$, particularly preferably $\leq 15,000 N/mm^2$.

Owing to its special properties, the drainage concrete of the invention is suitable for producing a road surfacing. Such a road surfacing is water-permeable, noise reducing and highly absorbent and meets all traffic safety requirements.

For this purpose, a bonding layer can first be applied to a previously cured base concrete and the drainage concrete can be installed directly on the bonding layer. If the base concrete is still fresh, the drainage concrete can be applied directly to the fresh base concrete. If this procedure is used, the bonding layer can be omitted if desired. The various layers can be applied in any known manner.

The modification according to the invention of the drainage concrete and, if applicable, the bonding layer with the anionic styrene/(meth)acrylate copolymer enables sufficient adhesion to the base or between the base concrete and the drainage concrete to be achieved. If desired, the drainage concrete can also be laid in one layer directly on the base and/or on an unbonded or bonded support layer. The single-layer construction is particularly suitable for water-permeable road surfaces. For this purpose, the support layer is to be made correspondingly water-permeable.

In road surfacing, the drainage concrete of the invention leads to a reduction in the noise emission preferably by at least 3 dB (A), in particular by at least 4 dB(A).

The drainage concrete of the invention is sufficiently water-permeable for rain water to be able to be drained away without puddle formation. This also significantly increases traffic safety, since the danger caused by aquaplaning and by restriction of vision as a result of spray is reduced.

The invention is illustrated by the following examples. The examples illustrate the invention without limiting it.

EXAMPLES

The water-cement ratio (w/c ratio) given in the examples is the quotient of the sum of water added, aggregate moisture and water content of the dispersion divided by the mass of cement.

Production of drainage concrete

The drainage concrete is produced in a stationary or mobile mixing unit, using a mechanical mixer having a good mixing action. The mixing time is, depending on the quality of the mixing action, at least 60 seconds after addition of all components. The following formulation is used for producing the drainage concrete.

Example 1

1495 kg/m³ of high-grade chippings, ⅝ mm,
350 kg/m³ of Portland cement CEM I 32.5 R (corresponds to PZ 35 S)
53 kg/m³ of water,
70 kg/m³ of ®Mowilith LDM 6880, styrene/butyl acrylate dispersion, Hoechst),
weight of mixture: 1968 kg/m³,
w/c ratio: 0.25.

Example 2

1585 kg/m³ of high-grade chippings, ⅝ mm,
300 kg/m³ of Portland cement CEM I 32.5 R (corresponds to PZ 35 S)
45 kg/M³ of water,
60 kg/m³ of ®Mowilith LDM 6880, (styrene/butyl acrylate dispersion, Hoechst)
weight of mixture: 1968 kg/m³,
w/c ratio: 0.25.

After addition of the components high-grade chippings, cement and water, mixing is carried out for about 20 seconds and the dispersion is subsequently added. The mixing time after the addition of the dispersion is at least 60 seconds. This formulation is used to produce a drainage concrete having an accessible void volume of about 20%.

PRODUCTION OF ROAD SURFACING

Production of a bonding layer

The bonding layer is produced in a high-speed mixer (1000 to 1500 rpm), for example Ultramischer U 80 (from Putzmeister, Aichtal, Germany) or ®Injecto-Compact 50/70 (from Hany, Switzerland). The mixing time using this mixer is about 30 seconds.

The mixture is produced with addition of the raw materials in the following order:
12.5 kg of water,
7.5 kg of Mowilith LDM 6880 dispersion,
0.2 kg of ®Addiment, levelling agent FMF (Heidelberger Baustofftechnik),
50.0 kg of Portland cement CEM I 32.5 R.
w/c ratio: 0.33

The components water, dispersion and levelling agent are weighed out in accordance with the mixing instructions and are premixed in the Ultramischer for about 5 seconds. After the premix phase, the cement is added. After all components have been added, mixing is carried out at most 20 seconds.

Laying the base concrete

The base concrete is installed in the intended thickness as classical road concrete by one of the known paving techniques, for example a slip form paver, sliding rail paver. The surface attains the final surface texture by smoothing and producing a texture with the aid of a jute cloth. The posttreatment of this concrete is carried out by keeping moist, for example by sprinkling with water or liquid posttreatment agents or by covering with moist cloths and/or films. The surface tensile strength of the base concrete has to be at least 2.0N/mm², preferably 3.0N/mm². If the above test value is not achieved, the load bearing capacity of the base concrete has to be improved by suitable surface treatment measures, for example shot blasting. Transverse and longitudinal joints in the base concrete are conventionally formed in accordance with the applicable regulations and rules, for example joint profiles. The keying and anchoring of the individual slabs is carried out in the middle of the base concrete. The spacing, number and dimensions of the keys and anchors is in accordance with the applicable regulations and rules.

Application of the bonding layer

The freshly prepared bonding layer is applied by hand or by spraying to the moistened, load-bearing concrete base. The amount applied is, depending on the roughness of the base, on average >2000 g/m$^2$. If the bonding layer is applied by hand, the bonding layer is brushed in mechanically by means of a hard broom. Alternatively, the bonding layer is applied by machine, for example using a spray beam or a spray platform or individual spray nozzles. Owing to the limited open processing time, the bonding layer is laid only just before the road paver.

Installation of the drainage concrete

The drainage concrete is installed on the freshly laid bonding layer using a road paver having a concrete stamper, a high-compaction board, a pressing strip and trailing roller. To achieve the required thickness and he optimum evenness, the paver, which has automatic height levelling, is conducted along a guide wire. The installation height can also be taken from an existing surface using a guide shoe. Directly behind the paver, the drainage concrete already has the finally formed surface which, owing to the low w/c ratio of the installed drainage concrete, is immediately post-treated. The surface is covered with moist cloths, for example jute or ®Geotextil, and/or films (PE film, thermofilm). The drainage concrete covering layer can be produced with and without dummy joints. If longitudinal or transverse joints are intended, the scoring is carried out to a depth of only 3 mm (scoring depth >30% of the installed thickness). The scoring is not cast into the drainage concrete. The longitudinal and transverse dummy joints in the drainage concrete are arranged so as to match the joint pattern of the base concrete. The cutting of the joints is, if joints are to be provided, carried out in good time after the drainage concrete has cured sufficiently.

Engineering testing for Example 1

Base concrete

Compressive concrete strength (after 28 days): ≧35N/mm$^2$
Bending tensile strength (after 28 days): ≧5.5N/mm$^2$
Surface tensile strength (after 28 days): ≧3.0N/mm$^2$
Freezing/deicing salt resistance: high Bonding layer Surface tensile strength (after 28 days): ≧3.0N/mm$^2$
Statistical modulus of elasticity (after 28 days): ≦20,000N/mm$^2$
Shrinkage: low
Freezing/deicing salt resistance: high Drainage concrete Void content (after 28 days): ≧15% by volume
Compressive concrete strength (after 28 days): ≧25N/mm$^2$
Bending tensile strength (after 28 days): ≧5.5N/mm$^2$
Tensile splitting strength (after 28 days): ≧2.5N/mm$^2$
Surface tensile strength (after 28 days): ≧3.0N/mm$^2$
Statistical modulus of elasticity (after 28 days): ≦20,000N/mm$^2$
Freezing/deicing salt resistance: high Composite system (base concrete/bonding layer/covering concrete)

Surface tensile strength in the contact zone (after 28 days): ≧30N/mm$^2$
Shear strength in the contact zone (after 28 days): ≧5.0N/mm$^2$ The invention has been described with reference to certain embodiments. Other embodiments of the invention will be apparent to those skilled in the art from consideration of the specification and practice of the invention disclosed herein.

Figure 2:
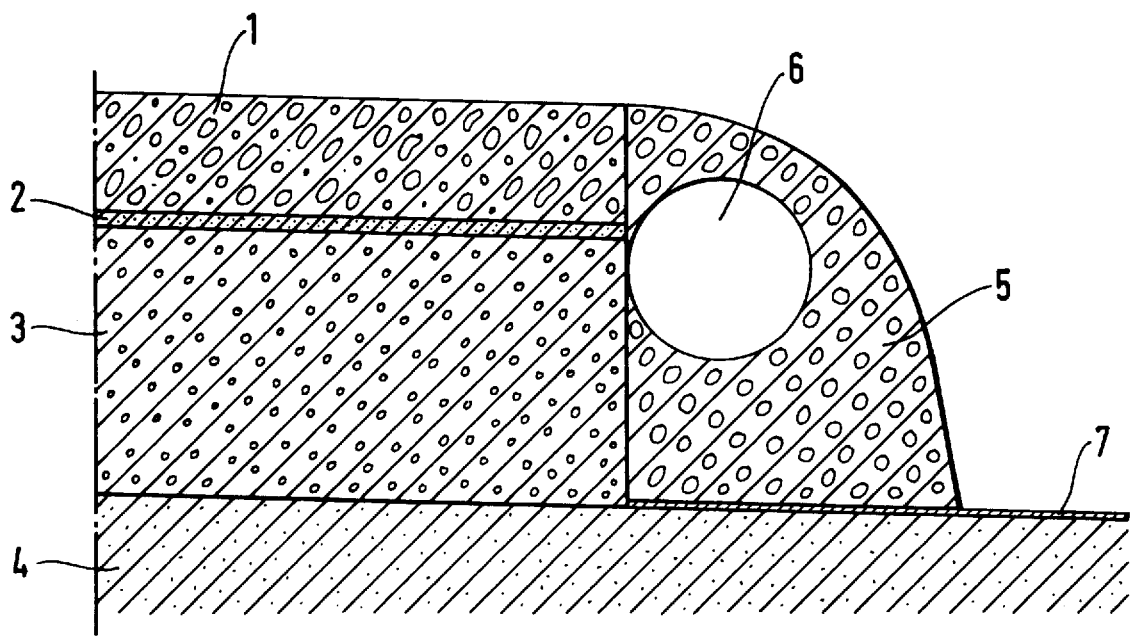
FIG. 2 shows a road structure comprising base concrete, bonding layer and drainage concrete.

In FIGS. 1 and 2 of the drawings, the reference numerals designate the following elements:

1 drainage concrete
2 bonding layer
3 covering concrete
4 support layer
5 monograin concrete
6 drainage
7 sealant

What is claimed is:

1. A drainage concrete having a void volume from 10 to 35% by volume comprising
   (a) a hydraulic cement binder,
   (b) a polymeric binder comprising an anionic styrene/(meth)acrylate dispersion copolymer, and
   (c) aggregates having particle sizes in the range from 2 to 32 mm.

2. A drainage concrete as claimed in claim 1, wherein the minimum film-formation temperature (MFT) of the polymeric binder is greater than 30° C.

3. A drainage concrete as claimed in claim 1, wherein the minimum film-formation temperature (MFT) of the polymeric binder is from 35° to 50° C.

4. A drainage concrete as claimed in claim 1, wherein the proportion of the polymeric binder is from 5 to 40% by weight, based on the mass of the hydraulic binder.

5. A drainage concrete as claimed in claim 1, wherein the proportion of the hydraulic binder is from 10 to 30% by weight, based on the mass of the drainage concrete.

6. A drainage concrete as claimed in claim 1, wherein the particle size of the aggregates is from 5 to 8 mm.

7. A process for producing a drainage concrete as claimed in claim 1, comprising mixing the hydraulic binder, the polymeric binder, and the aggregates, with water.

8. A process as claimed in claim 7, wherein the aggregates and hydraulic binder are first mixed with water and the polymeric binder is subsequently added in the form of an aqueous dispersion.

9. A method of using the drainage concrete as claimed in claim 1, comprising applying the drainage concrete to a surface.

10. A drainage concrete of claim 1, wherein the hydraulic binder is selected from the group consisting of Portland cements and composite cement.

11. A drainage concrete of claim 1, wherein the anionic styrene/(meth) acrylate dispersion copolymer comprises
   (a) from 51 to 60 parts by weight of styrene and optionally, methyl methacrylate;
   (b) from 40 to 45 parts by weight of (C$_2$–C$_8$)-alkyl acrylate, or (C$_4$–C$_8$)-alkyl methacrylate, or mixtures thereof; and
   (c) from 2 to 4 parts by weight of one or more α,β-unsaturated carboxylic acids, wherein the sum of (a)+(b)+(c) is 100 parts by weight based on the weight of said anionic styrene/(meth)acrylate dispersion copolymer.

12. A drainage concrete of claim 1, wherein the anionic styrene/(meth)acrylate dispersion copolymer comprises
   (a) from 51 to 58 parts by weight of styrene and optionally, methyl methacrylate;
   (b) from 40 to 45 parts by weight of (C$_2$–C$_8$)-alkyl acrylate, (C$_4$–C$_8$)-alkyl methacrylate, or mixtures thereof; and (c) from 2 to 4 parts by weight of one or more α,β-unsaturated carboxylic acids, wherein the sum of (a)+(b)+(c) is 100 parts by weight based on the weight of said anionic styrene/(meth)acrylate dispersion copolymer.

13. A drainage concrete of claim 11, wherein the anionic styrene/(meth)acrylate dispersion copolymer further comprises (d) 0 to 2% by weight of ethylenically unsaturated comonomer units containing sulfonic acid groups or phosphoric acid groups or phosphoric acid groups;

(e) 0 to 2% by weight of ethlyenically unsaturated comonomer units containing organosilicon radicals; and (f) 0 to 2% by weight of epoxysilanes;

the percentages of (d), (e) and (f) being based on the weight of the sum of the components (a), (b), and (c) and wherein the sum of (e)+(f) is less than 2% by weight.

14. A drainage concrete of claim 11, where the anionic styrene/(meth)acrylate dispersion copolymer comprises (a) from 52 to 55 parts by weight of styrene;

(b) from 41 to 44 parts by weight of n-butyl acrylate; and (c) from 2 to 3 parts by weight of acrylic acid, methacrylic acid, or mixtures thereof;

(d) from 0.5 to 1.5 parts by weight of ethylenically unsaturated comonomers containing sulfonic acid groups;

(e) from 0.5 to 1.5 parts by weight of ethylenically unsaturated comonomers containing organosilicon radicals;

(f) from 0.5 to 1.5 parts by weight of epoxysilanes;

wherein the sum of (e)+(f) is at most 2 parts by weight, said parts of (d), (e) and (f) being based on 100 parts of (a)+(b)+(c).

15. A drainage concrete of claim 1, wherein the hydraulic binder is present in an amount from 10 to 35% by weight and the aggregates are present in an amount from 65 to 85% by weight, the weights being based on the weight of the drainage concrete.

16. A drainage concrete of claim 1, wherein the water-cement ratio of the drainage concrete is from 0.15 to 0.50.

17. A drainage concrete of claim 1, wherein the styrene/(meth)acrylic dispersion copolymer comprises styrene and butyl acrylate.

18. A method for producing a water-permeable road surfacing comprising applying a bonding layer to a cured base concrete;

installing a drainage concrete on the bonding layer, said drainage concrete having a void volume of from 10 to 35% by volume, comprising (a) a hydraulic cement binder, (b) a polymeric binder comprising an anionic styrene/(meth)acrylate dispersion copolymer, and (c) aggregates having particle sizes in the range from 2 to 32 mm.

19. A method for producing a water-permeable road surfacing comprising installing a drainage concrete on a base concrete, said drainage concrete having a void volume of from 15 to 35% by volume, comprising (a) a hydraulic cement binder, (b) a polymeric binder comprising an anionic styrene/(meth)acrylate dispersion copolymer, and (c) aggregates having particle sizes in the range from 2 to 32 mm.

20. A process as claimed in claim 7, wherein additives or additional components are mixed with the hydraulic binder, the polymeric binder, the aggregates, and the water.

21. A drainage concrete having a void volume from 15 to 35% by volume comprising (a) a hydraulic cement binder, (b) a polymeric binder comprising an anionic styrene/(meth)acrylate dispersion copolymer, and (c) aggregates having particle sizes in the range from 4 to 32 mm.

22. A drainage concrete as claimed in claim 1, wherein said aggragates comprise chippings or gravel.

* * * * *